United States Patent
McClellan, Sr.

[15] 3,673,567
[45] June 27, 1972

[54] REMOTE DOG-BARK SUPPRESSOR

[72] Inventor: John F. McClellan, Sr., Stansbury Mill Road, Monkton, Md. 21111

[22] Filed: Oct. 28, 1970

[21] Appl. No.: 84,552

[52] U.S. Cl..............................340/148, 181/0.5, 342/404
[51] Int. Cl............................................................G11b 5/00
[58] Field of Search............340/148, 406, 279; 179/100.41, 179/170.2, 1 F, 1 FS, 1 J, 1 VC, 1 DM, 100.2 RE; 181/0.5 R

[56] References Cited

UNITED STATES PATENTS

| | | |
|---|---|---|
| 2,012,187 | 8/1935 | Florisson..............................340/406 |
| 2,194,559 | 3/1940 | Koch....................................340/148 |
| 2,723,316 | 11/1955 | Goodell et al...................179/100.2 R |
| 2,931,020 | 3/1960 | Bender..............................340/148 X |
| 3,444,330 | 5/1969 | Battle..........................179/100.2 RE |
| 3,557,899 | 1/1971 | Longinette et al......................181/0.5 |

Primary Examiner—Donald J. Yusko

[57] ABSTRACT

An acoustic system for remotely suppressing dog barks by replaying the barks of a dog to the dog, creating a mimicking effect by volume change, time delay, modulation change, or pitch change, in one or more combinations appropriate to the dog; pitch change includes rebroadcasting the barks to the dog at pitch frequencies above the characteristic range of human hearing; an arbitrary-sound embodiment is disclosed.

14 Claims, 3 Drawing Figures

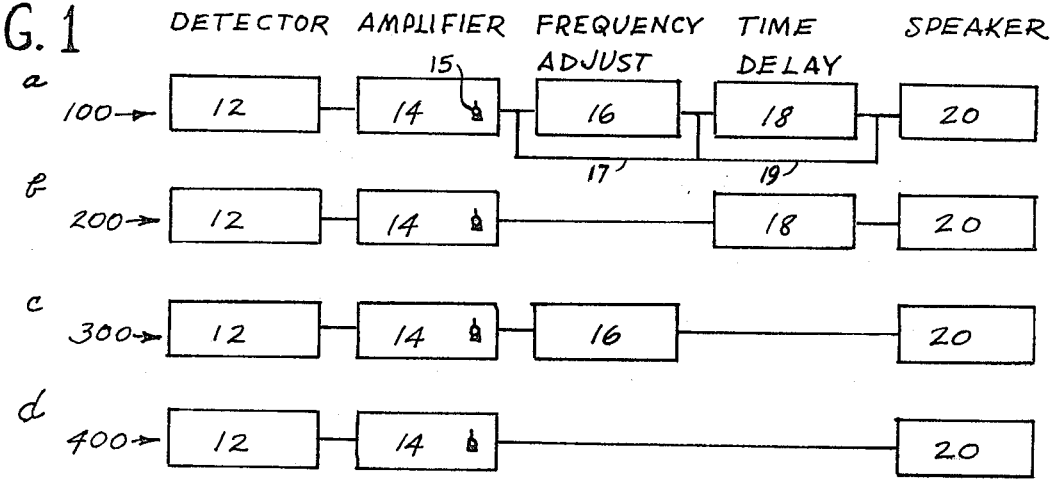
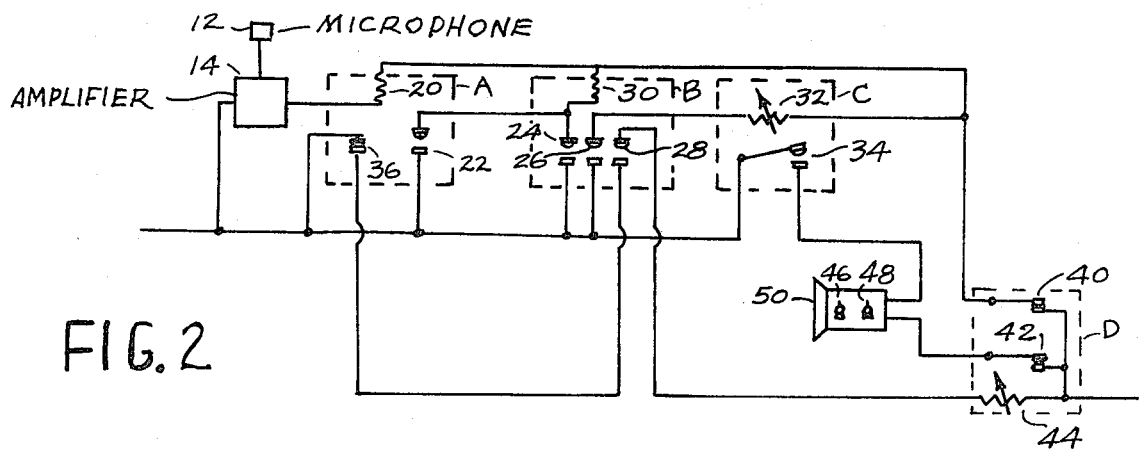
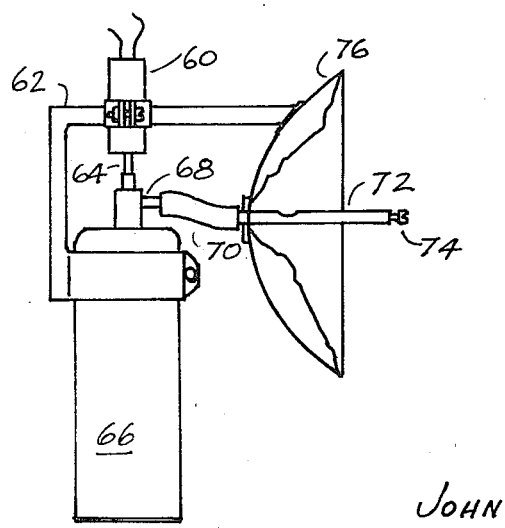
INVENTOR.
JOHN F. McCLELLAN SR.

REMOTE DOG-BARK SUPPRESSOR

This invention relates generally to animal education and specifically to remote means and method for inhibiting a dog from barking.

Among the most annoying noises to which man is subjected are repetitive barks of his or his neighbor's dog. This annoyance reaches its maximum when the dog is chained or penned in close proximity to the bedroom of a would-be sleeper or to the study of a student, and when the dog is of a nervous nature and inclined to voice its frustration for protracted periods.

No invention of modern man can bring more neighborhood peace and harmony than an ideal dog-bark silencer. Certain silencers, employing electric-shock collars, have been developed. However, since some dog owners resent efforts by others to shock their dogs, the ideal solution has not heretofore appeared, and is the object of the present invention.

Ideally, a dog silencer should be fast acting, imperceptible to humans if so desired, remotely applicable to the dog (e. g. to a neighbor's dog) without danger of detection if desired, as kind and humane as possible to the dog, and absolutely effective. If, in addition, the dog silencer is simple to use, flexibly adjustable, and can be purchased or rented cheaply, so much the better.

According to the present invention these objects are accomplished through provision of a portable acoustic device which receives the dog bark and re-directs or re-plays it to the dog as an effective mimic to inhibit the barking.

I have discovered that dogs are subject to silencing by mimicry in much the same way that humans are. Anyone who has had another repeat all his words after him can attest that skillful mimicking induces silence. With dogs this is more difficult because the mimicry must be repeated over considerable periods of time, without fail, and with machine-like precision, to have a lasting training effect. If the mimicry is simultaneous, the volume must be overpowering for the dog to hear it over its own barking. If the mimicry is offset in time so that the dog is silent for at least a part of it, much lower volume can be used. Although close tonal fidelity is best for training some dogs, if the mimicry distorts in pitch or duration, this can have additional effect, as it does in the case of humans. Fortunately, effective pitch distortion includes frequency shift so that the mimicry can be accomplished in the frequency range above human audibility but within canine audibility.

In various embodiments of this invention therefore, the replayed signal is rendered inaudible to the human ear by upward frequency displacement while remaining audible to the dog, is delayed in replay by a chosen interval, is rendered overpowering in volume so that the dog hears the mimic bark even though he is at the time barking, or any of these in combination. High directionality of the received and transmitted signals is another provision of the invention.

These and other objects and advantages of the invention will become apparent on examination of the following description, including the drawings, in which:

FIGS. 1a through 1d are block diagrams of systems according to this invention;

FIG. 2 is a wiring diagram; and

FIG. 3 is a detail of a signal generating arrangement.

Turning now to the figures in detail, in FIG. 1a, system 100 according to this invention is shown in outline form.

The detector 12 picks up the sounds of barking; those are amplified by amplifier 14, which is volume-adjustable, as indicated at 15, pitch-adjusted by a frequency adjuster or setter 16, time delayed or shifted in phase with the original barking by a time delay unit 18, and rebroadcast to the dog, as by a directional speaker or equivalent device 20. Not all of the elements are required for every application, but all are included in the most complete embodiment of the invention.

In the FIG. 1b embodiment 200 the frequency adjuster 16 is omitted; in the FIG. 1c embodiment 300 the time delay unit 18 is omitted; in the FIG. 1d embodiment 400 both these elements are deleted, only a highly directional detector 12, amplifier 14, and highly directional speaker 20 being used.

Omission of the frequency adjustment and/or time delay feature can be easily accomplished in the FIG. 1a system by switch-controlled shunting of one or both units 16 and 18, as indicated at 17 and 19.

The effects on the dog can be varied. In the simplest use of the equipment as in FIG. 1d, the barking can simply be directed back to the dog with tremendous amplification. This ploy has to be used judiciously if humans are within close range of the speaker and in the direction of broadcast, however just it may seem to the user to blast the eardrums of a neighbor with the bark of the neighbor's own dog. Regenerative feedback is a problem, too, because the microphone used may tend to pick up the sounds emitted by the speaker.

In a more complex use of the equipment, time delay can be used (FIG. 1b) so that the dog hears each bark in a series directed back to him with just enough delay to let him hear it as a mimic of his last bark. It is well known human psychology, which I have discovered applies to canines as well, that skillful mimicking induces silence, as noted above.

Effective time-separation of the received and re-emitted barks is feasible because repetitive dog barking is characterized by a regular series of pulses, each of which is of about the same duration as the time interval between pulses. The feedback problem is eased by the time delay feature also.

The ultimate solution to the neighbor-eardrum blasting problem and to the feedback problem lies in a further provision of the invention-pitch change of the rebroadcast, so that it is made inaudible to humans while remaining audible to dogs.

FIG. 1c diagrams the simplest embodiment of this feature. Raising the frequency of the broadcast signal to the range of 20,000 cps and above prevents the neighbors from hearing it. Dogs characteristically respond to tones as high pitched as 60,000 cps. (Encyclopedia Brittannica 1966 Ed. Vol. 11 page 217) as, for example, to whistles from "silent" dog calls. When sufficiently loud, such signals are quite painful to the ears of dogs and according to this invention are employed to punish the dog as each bark is emitted, quickly leading to silence.

The "silent" rebroadcast can also be phase shifted (FIGS. 1a and 1b) to provide pitch-distorted mimicking inhibitory effect without using great volume, preventing undue pain.

The elements disclosed in FIG. 1 are easily within the known state of the acoustic reception and reproduction art. An ordinary carbon microphone can be used to limit higher frequency response. Alternatively, a filter network can be used with the detector for the purpose. Pitch change is easily accomplished in the audio frequency range in a manner analogous to heterodyning of radio signals, by mixing with a signal of chosen frequency to produce the desired "beat" frequency. Almost any broad-band audio amplifier can be used with the systems shown.

Adjustable time delay subcircuits are well known in the art. Delays of several seconds are easily achievable, although for the purposes of this invention delays of less than that are sufficient; adjustment within the range of one one-hundredth second to one second is desirable to suit the characteristics of individual dogs, making the device more efficient and helping minimize feedback. One of the most widely used adjustable delay systems is the magnetic tape loop system with an adjustable time-relation between the recording and playback stations. Reverberation systems are also used for the purpose, employing spring-connected audio transducers.

Speakers for the range can be standard, but like the rest of the system are preferably of weather-proof design. Cone "tweeters" can be used to reproduce sounds in a range above 20,000 cps, and lower frequency emission can be filter-network limited. Alternatively, electrostatic speakers or analogous devices can be used in the high ranges.

I have discovered that high-frequency reproduction of dog barking may be simulated, using the amplified received bark to trigger an independent high-frequency sound source, such as a "silent" dog whistle, with good inhibitory effect.

In such simulation the tonal modulation of the individual dog bark is missing, but this can be to some extent simulated by speaker design and actuation, if desired.

FIG. 2 shows the embodiment employed for this.

In FIG. 2 the dog-bark signal is received by microphone 12, amplified by amplifier 14, and actuates a series of relays A, B, C, D and a "speaker" assembly 50, to produce a delayed acoustic pulse having a pulse length about the same as the original signal.

The amplified pulse through relay coil 20 of relay A, a single pole double throw relay, closes normally open contact 22 and opens normally closed contact 36. Closure of contact 22 activates coil 30 of relay B, a triple pole single throw normally open relay, closing the contacts 24, 26, and 28 of relay B, which remain closed until such time as the coil circuit is opened by relay D, a double pole, single throw normally closed relay.

Contact 26 of relay B actuates the adjustable time delay element 32 of relay C, a single pole single throw normally open relay. This should be a relatively wide range element, adjustable from zero to about 1-second delay. It may be a thermal element, capacitor element or any other analogously functioning device. After the adjusted delay has occurred, contact 34 of relay C closes, actuating the speaker assembly 50, which continues to sound until interrupted. Pitch and volume controls are preferably provided as indicated at 46 and 48. Interruption of the broadcast signal is provided for through contact 28 of relay B, which, on closure, arms time delay relay sequence for actuating element 44 of relay D. Element 44 of relay D is preferably identical in delay characteristic with element 32 of relay C, and may be ganged with it as indicated to provide simple adjustment of time delay without altering pulse length, as indicated in the Figure.

The armed sequence begins when the received dog-bar pulse or signal ends, allowing contact 36 of relay A to close.

Immediately, element 44 of relay D begins the delay cycle for that relay, which ends in opening the contacts 40 and 42, dropping coil 30 of relay B out of the circuit, stopping the "speaker" assembly, and resetting the system.

FIG. 3 shows an example of a "speaker" assembly which can be used in the FIG. 2 circuit.

Solenoid 60 is positioned by bracket 62 to actuate valve 64 of compressed gas container 66. The gas exhaust 68 of the container is conducted by tube 70 to dog whistle 72, which may be of the "silent" type and pitch-adjustable by screw 74. Bracket 62 supports the whistle and a parabolic reflector 76 for directing the emitted signal.

From the foregoing, the realization of several objects and advantages will become apparent. Through provisions of this invention, each dog bark in a series can be effectively answered with a mimicking sound signal. The signal can be audible or inaudible to humans, as desired; it can be coincident with or shifted in time from the bark; it can be proportional in modulation, duration, and pitch to the bark, or conversely it can be of constant volume, of lesser or greater duration than, and unrelated in pitch to, the bark. According to the psychology of the individual breed, or to the individual dog within the breed, the dog can either be stilled, or made to bark more softly, depending on how much amplification is used in the course of the training, or how much time-delay is employed, or what pitch is used. The trainer is given great flexibility in working with the individual dog at no great cost in money or effort on his part. Once the apparatus is set in place and, if necessary, adjusted, no further attention is required if it is powered from house-wiring. If battery-powered the device is more mobile, but requires periodic battery replacement. Although the embodiment employing a solenoid is cheapest, pulse length should be reduced to the minimum in battery powered versions, to conserve batteries. This is easily accomplished by using a differentiator in the amplifier input signal if no other adjustment is provided. In either case, the apparatus is not obtrusively large, and can easily be concealed in a small box.

Obviously many modifications and variations of the present invention are possible in light of the above teachings. It is, therefore, to be understood that within the scope of the appended claims the invention may be practiced otherwise than as specifically described.

I claim:

1. A dog training device for remotely suppressing the barking of a continually barking dog with minimum disturbance to humans, comprising: means for receiving the barks from a continually barking dog, and means for remotely emitting bark-mimicking acoustic signals audible substantially only to said barking dog in timed response to the receiving means' reception of said barks.

2. A device as recited in claim 1, wherein the means for emitting acoustic signals includes means adapted to emit signals pitched above the characteristic upper frequency threshold of human hearing but within the characteristic hearing frequency range of dogs.

3. A device as recited in claim 1 wherein the means for emitting acoustic signals includes means for directing the signals emitted substantially to the dog alone.

4. A device as recited in claim 3, wherein the means for emitting acoustic signals includes means for delaying the time of emission of said respective acoustic signals relative to the times of the barks.

5. A device as recited in claim 4, and means for adjusting the pitch frequency of said means for emitting acoustic signals.

6. A device as recited in claim 3, wherein the means for emitting acoustic signals includes means for proportioning the duration of said emitted acoustic signals to the duration of the respective barks.

7. A device as recited in claim 3 and means for adjusting the volume of said emitted signals.

8. A device as recited in claim 2 wherein the emitting means includes means for proportioning the pitch frequency of the emitted signals to the pitch frequency of the respective barks.

9. A device as recited in claim 3, wherein the emitting means includes means for establishing the pulse duration of the emitted signals independently of the duration of the respective barks.

10. A device as recited in claim 3, wherein the emitting means includes means for establishing the intonative modulation of the emitted signals independently of the intonative modulation of respective barks.

11. A device as recited in claim 2 wherein the means for emitting acoustic signals includes means for adjusting the time of emission of said respective acoustic signals relative to the times of the barks.

12. The method of remotely inhibiting the barking of a continually barking dog comprising: (a) acoustically receiving barks from a said continually barking dog, and (b) responsively emitting acoustic signals to the dog in timed relation to respective of said barks, thereby remotely inhibiting said dog barks.

13. A method as recited in claim 12 wherein the broadcast signals are pitched above the characteristic human hearing range but within the characteristic range of hearing of dogs, thereby preventing said acoustic signals from disturbing human beings within the range of said signals during employment of said method.

14. A dog training device, comprising: means for receiving dog barks, and means for emitting mimicking acoustic signals toward the origin of the dog barks in response to the receiving means reception of respective dog barks for thereby remotely inhibiting said dog barks, said mimicking acoustic signals being pitched above the characteristic upper frequency threshold of human hearing but within the characteristic hearing frequency range of dogs.

* * * * *